3,621,653
POWER GENERATION PLANT
Pierre Henri Pacault, Ville d'Avray, and Francis J. Mary, Paris, France, assignors to Babcock-Atlantique Societe Anonyme, Paris, France
Filed Mar. 17, 1969, Ser. No. 807,511
Claims priority, application France, Mar. 25, 1968, 145,151
Int. Cl. F01k 23/00, 23/10
U.S. Cl. 60—38
17 Claims

ABSTRACT OF THE DISCLOSURE

Power generation plant includes a primary steam power generation cycle and a secondary power generation cycle employing a working fluid of low freezing point, the vapourisation of the working fluid being performed by heat exchange with the vapour exhausted from the primary cycle. In addition, the plant includes a refrigerating cycle which is appropriate to lower the temperature at the cold source of the secondary cycle. This refrigerating cycle is intended to be brought into operation during the hours of slack demand for motive power.

BACKGROUND OF THE INVENTION

(1) Field of the invention

This invention relates to power generation plants and to methods of operating such plants.

(2) Description of the prior art

In the sphere of large power generation plants applying a steam cycle, it is known to be advantageous not to depressurise the steam to the pressure level of the condenser, but to exploit the steam, as a source of heat at its outlet from the turbine, in a second power generation cycle which employs a working fluid providing a distinctly smaller volumetric rate of delivery than the steam, for an identical variation in the enthalpy flow.

For a given power, the application of a fluid of this nature results in a substantial reduction in the total outflow section to the condenser. This renders it possible not only to build machines which are less bulky, but also single-shaft units which are more powerful at less cost per kilowatt in service than those operating solely with steam.

Another advantage of such power generation cycles employing two fluids, is that they are able to generate power more cheaply since they are better able to exploit the lower temperatures of the water of refrigeration of the condenser in winter.

By way of example, fluids such as difluoro-dichloromethane or "FREON 12," and dichloro-monofluoromethane or "FREON 21" currently employed as refrigerating fluids, appear to be particularly appropriate to take over from steam in the last stages of the turbines.

A main object of the invention is to exploit the low freezing point of such fluids.

SUMMARY

According to the invention power generation plant comprising a primary power generation steam cycle and a secondary power generation cycle employing a working fluid of low freezing point, the vapourisation of the working fluid being performed by heat exchange with the vapour exhausted from the primary cycle, is characterised by the addition of a refrigerating cycle which employs a refrigerating fluid and which is appropriate to lower the temperature of said working fluid at the source of coldness of the secondary cycle.

Preferably the plant comprises a reserve of coldness for alternate accumulation and restitution of frozen products and for intermittent lowering of the temperature at the cold source according to the fluctuations in the demand on the grid.

According to one form of embodiment, the working fluid and the refrigerating fluid are of the same nature.

The invention is applicable to plants of a variety of types, but is particularly appropriate for those which, for the primary cycle, employ a source of heat such as, for example, a nuclear reactor. In this case it is not of interest to cause the same to follow the fluctuations in the demand for power. In such circumstances, the refrigerating machine and the reserve of coldness, which require no more than relatively low installation costs, render it possible to effect a profitable storage of the surplus of power during slack periods, and to return the same during working periods or peak periods, by slowing down or stopping the refrigerating machine and by exploiting the frozen products accumulated to lower the temperature of the cold source of the secondary cycle.

DESCRIPTION OF THE PREFERRED EMBODIMENT

Figure 1:
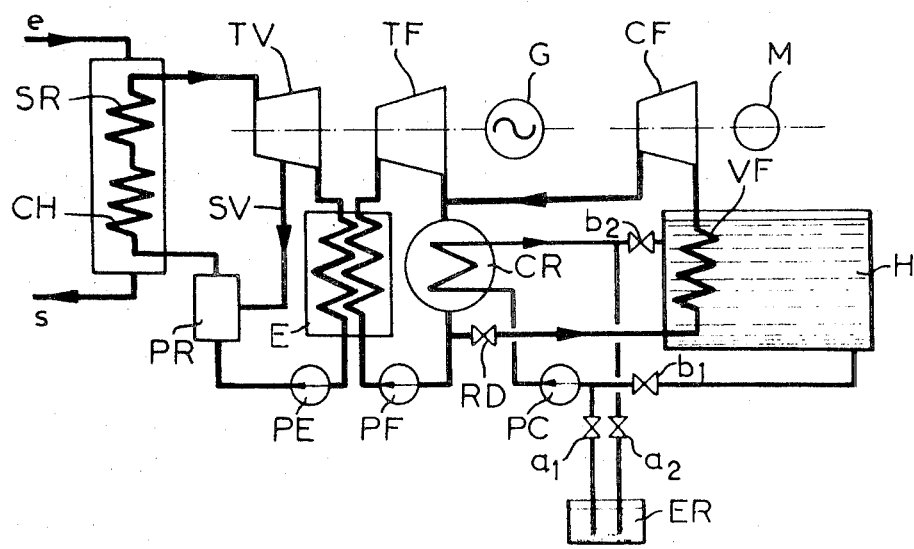
FIG. 1 diagrammatically illustrates, by way of example, a power generation plant.

With reference to FIG. 1, a power generation plant has a steam generation boiler, comprising an evaporator CH and a superheater SR, which as a source of heat employs a fluid, with an inflow $e$ and an outflow $s$, circulating in a circuit arranged with a reactor (not shown).

The steam generated is expanded in a turbine TV comprising one or more casings, and then condensed in an exchanger E. The water collected in the exchanger E is drawn by a feed pump PE which impels the water to the nest of tubes forming the evaporator CH, through a reheating station PR fed by means of tapping pipes SV drawing from the turbine TV.

In the exchanger E, the heat of condensation of the steam is exploited to vapourise a second working fluid having a low freezing point. The vapour thus produced is expanded in a turbine TF and then exhausted to a condenser CR. The condensed second fluid is then returned to the exchanger E by a pump PF.

The cooling of the condenser CR is performed by two sources arranged in parallel, one being a source ER of water of refrigeration, for example consisting of a river or of an atmospheric coolant, and the other being a source H consisting of a vat or tank of brine. The source ER is in communication with the condenser CR through inlet and outlet pipes controlled, respectively, by means of valves $a1$ and $a2$. The brine pipes connecting the tank H to the condenser, are controlled by means of valves $b1$ and $b2$.

The refrigerating fluid of the condenser drawn from one or the other of these two sources, is circulated by a pump PC.

The plant comprises a refrigerating machine for freezing the brine in the tank H. In this example, the compressor CF of this refrigerating machine, driven by a motor M, employs a fluid of the same nature as that employed as the working fluid for the secondary cycle, as a refrigerating fluid.

In operation of the refrigerating machine, the refrigerating fluid is first expanded by flowing through the valve RD, then vapourised in an evaporator VF submerged in the brine which has the result of cooling the latter, drawn in and compressed again in the vapour state by the compressor CF, liquefied in the condenser CR by means of the cooling source ER, and finally returned to the expansion valve RD to restart the brine refrigeration cycle.

The plant described above is thus appropriate for at least the two following methods of operation:

(A) Operation at slack periods, with accumulation of power.—The valves $b1$, $b2$ are closed, and the valves $a1$, $a2$ are open. The compressor CF is in operation.

The brine of the tank H is cooled and freezes progressively to form a reserve of frozen products, whilst the cooling of the condenser CR is performed by the source ER. The power delivered to the grid by the generator G is reduced by the power absorbed by the compressor CF.

(B) Operation during full-load periods, with restitution of power.—The valves $a1$, $a2$ are closed, the valves $b1$, $b2$ are open, and the compressor CF is stopped. The cooling of the condenser CR is performed by means of cold liquid brine. The brine, drawn from the tank H by the pump PC, transfers its frozen products to the condenser and returns to the tank, whose frozen part is liquified progressively. The power delivered to the grid by the generator G is at its maximum, since the motor M is stopped and the temperature of the cold source of the secondary cycle is lowered.

Figure 2:
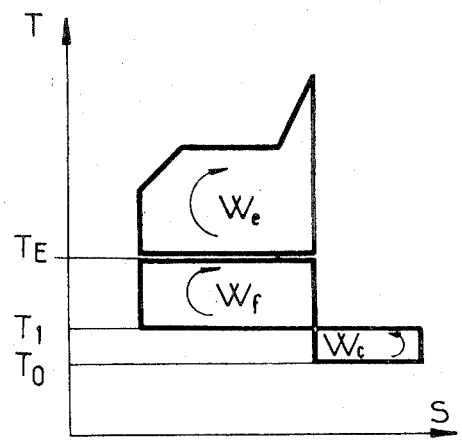
FIGS. 2 and 3 illustrate, with respect to plant shown in FIG. 1, the working cycles performed by the different deliveries of fluid employed during accumulation periods or slack periods, and during power restitution periods or full-load periods.
Figure 3:
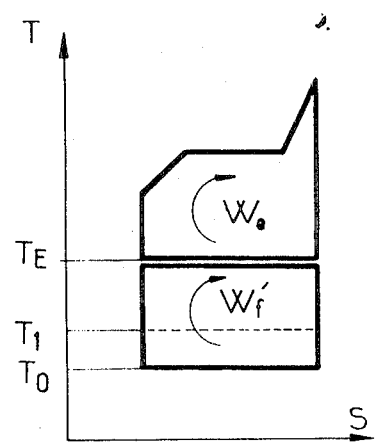

The diagrams of FIGS. 2 and 3, corresponding to these two methods of operation A and B, illustrate in simplified form the cycles performed by the primary and secondary working fluids and by the flow of refrigerating fluid. In these diagrams, the absolute temperatures are plotted as ordinates, and the flows of entropy that is to say the products of mass-flow with the variations of entropy, have been plotted as abscissae.

It is known that in a representational system of this kind, the area delimited by a closed outline traversed by the representative point of one of the fluids measures the power generated or consumed during its cycle, according to the direction of traversal of the same.

Thus in the upper part of each diagram, there is shown the conventional cycle characteristic of super-heated steam, to which the power generated $W_e$ is identical in both cases. This cycle is delimited in its lower part by the temperature level $T_E$ corresponding to the transfer of heat in the exchanger E of FIG. 1, which transfer is depicted by a double horizontal line.

The evolutions of the secondary fluid, which vary from one diagram to the other, are situated below the level $T_E$. During the period of accumulation, the greater part of this secondary fluid performs a power generation cycle comprised between the temperature $T_E$ and that $T_1$ of the condenser CR, and provides a power $W_f$. However, a definite quantity of the same fluid, employed as a refrigerant, in the opposite direction describes the outline of the rectangle illustrated in FIG. 2, at the bottom right, and which is inserted between the temperature $T_1$ of condensation and the freezing temperature $T_0$ of the brine. The area of this rectangle measures the power $W_c$ consumed by the compressor CF for the generation of coldness during slack periods. During this period, the power $W_a$ effectively generated by the plant as a whole is thus reduced to:

$$W_a = W_e + W_f - W_c$$

During the restitution of the coldness accumulated, the refrigerating machine is stopped, and the secondary fluid goes through a power generation cycle comprised between the temperature levels $T_E$ and $T_0$, as shown by FIG. 3, whilst supplying a power $W'_f$, which is greater than $W_f$.

If the number of hours under full load and the number of slack hours are denoted, respectively, by $hp$ and $hc$, these hours corresponding to one and the same variation in the coldness accumulated, the following applies theoretically, i.e. in the absence of any loss:

$$W'_f = W_f + \frac{hc}{hp} W_c$$

In other words, the total power $W_r$ generated during a restitution period is expressed by the formula:

$$W_r = W_e + W_f + \frac{hc}{hp} W_c$$

So that a given power $W_r$ may be available during full-load periods, the quantity of secondary fluid traversing the circuit comprising RD, VF and CF during slack periods, is thus reduced, the higher the actual ratio between the slack periods $hc$ and the full-load periods $hp$ becomes.

We claim:

1. A power-generation plant, comprising primary steam-power generation apparatus and secondary power generation apparatus including a turbine and condenser and employing a working fluid of a lower freezing point than that of water, means for vaporizing the working fluid by heat exchange with the vapor exhausted from the primary apparatus;

a reservoir of liquid having a lower freezing point than that of said working fluid, and a refrigerating machine for lowering the temperature of liquid in said reservoir;

first means including a circuit connection between said reservoir and said condenser for lowering the temperature of said working fluid by heat exchange with liquid in said reservoir, second means including a circuit connection to said condenser from an external supply of cooling liquid for lowering the temperature of said working fluid by heat exchange with externally supplied liquid;

and selectively operable means for connecting a selected one of said first and second means in temperature lowering relation with said working fluid.

2. A plant according to claim 1, in which said first and second means include a common connection to said condenser.

3. A plant according to claim 1, in which said refrigerating machine is driven by a fraction of the power output of said turbine.

4. A plant according to claim 1, in which said primary apparatus includes a turbine mechanically ganged to the turbine of said secondary apparatus.

5. A plant according to claim 4, in which said plant includes an electric generator mechanically ganged to said turbines.

6. A plant according to claim 1, in which said refrigerating machine utilizes a refrigerating fluid having a freezing point lower than that of water.

7. A plan according to claim 6, in which said refrigerating fluid and said working fluid are one and the same.

8. A power-generation plant, comprising primary steam-power generation apparatus and secondary power generation apparatus including a turbine and condenser and employing a working fluid of a lower freezing point than that of water, means for vaporizing the working fluid by heat exchange with the vapor exhausted from the primary apparatus, ambient-temperature means connected to said condenser for normally utilizing an ambient-temperature heat exchange with said working fluid, and a mechanical refrigeration system including means driven by the output of said turbine for mechanically compressing and recirculating a refrigerating fluid, cold-storing means cooled by said refrigerating fluid, and circuit means including a selectively operable connection between said cold-storing means and said condenser for performing a heat exchange between said cold-storing means and said working fluid; whereby in periods of slack demand said refrigeration system may cool and thus replenish said cold-storing means and in periods of relatively great demand said selectively operable connection may provide enhanced cooling of said working fluid, thereby enhancing the mechanical power output of said turbine.

9. Plant according to claim 8, wherein the refrigerating machine operates by mechanical compression of the refrigerating fluid.

10. Plant according to claim 8, wherein the working fluid and the refrigerating fluid are of the same nature.

11. A power-generation plant, comprising primary steam-power generation apparatus and secondary power generation apparatus including a turbine and condenser and employing a working fluid of a lower freezing point than that of water, means for vaporizing the working fluid by heat exchange with the vapor exhausted from the primary apparatus, ambient-temperature means connected to said condenser for normally utilizing an ambient-temperature heat exchange with said working fluid, a mechanical refrigeration system having an input-power requirement that is small compared to the mechanical output of said turbine and including means driven by the output of said turbine for mechanically compressing and recirculating a refrigerating fluid at less than ambient temperature, and circuit means including a selectively operable connection between the refrigerated output of said refrigerating system and said condenser for performing a heat exchange between said refrigerated output and said working fluid; whereby, when said connection is selected, the working fluid may be further cooled to enhance the temperature gradient in said secondary apparatus.

12. Plant according to claim 11, wherein said primary apparatus includes a heat source of the constant rate of operation or permanent operation type.

13. Plant according to claim 11, including an intermediary fluid network performing the heat exchange between the refrigerating fluid and the working fluid.

14. Plant according to claim 13, wherein said intermediary fluid network comprises a tank of freezable intermediary fluid forming a reserve of coldness.

15. The method of operating a power-generating plant characterized by primary steam-power generation apparatus and secondary power generation apparatus having a condenser and employing (1) a working network utilizing a working fluid of lower freezing point than that of water (2) a refrigerator employing a refrigerating fluid, and (3) an intermediary fluid network, which method comprises: continuously vapourizing the working fluid by heat exchange with the vapour exhausted from the primary apparatus, using the refrigerating machine in a period of slack demand as a freezer of fluid in said intermediary fluid network while concurrently using fluid at atmospheric temperature to cool said condenser, and in a period of greater demand interrupting the freezing of fluid in said intermediary fluid network while using intermediary fluid to cool said condenser.

16. The method of claim 15 wherein the working fluid and the refrigerating fluid are the same.

17. A power generating plant comprising primary steam generation apparatus and secondary power generation apparatus including a turbine and condenser and employing a working fluid of a lower freezing point than that of water, means for vapourizing the working fluid by heat exchange with the vapour exhausted from the primary apparatus, cooling-fluid means including a connection to said condenser for effecting a normal heat exchange with said working fluid, cold-storage means, a refrigerating machine including a circuit for circulating a refrigerating fluid through said cold-storage means, and selectively operable means including a connection between said cold-storage means and said condenser to lower the temperature of said working fluid at the condenser of said secondary apparatus by exchange of heat between said cold-storage means and said working fluid.

References Cited
UNITED STATES PATENTS

| | | | |
|---|---|---|---|
| 666,043 | 1/1901 | Zoelly | 60—38 |
| 1,632,575 | 6/1927 | Abendroth | 60—38 |
| 2,982,864 | 5/1961 | Furreboe | 60—95 X |
| 3,257,806 | 6/1966 | Stahl | 60—38 X |

MARTIN P. SCHWADRON, Primary Examiner

A. M. OSTRAGER, Assistant Examiner

U.S. Cl. X.R.

62—333